Oct. 17, 1933.                G. T. REICH                1,930,861
                        CONCENTRATION EVAPORATOR
                        Filed Nov. 5, 1926        3 Sheets-Sheet 1

Inventor:
Gustave T. Reich
By Byrnes Townsend & Brickenstein
his Attorneys.

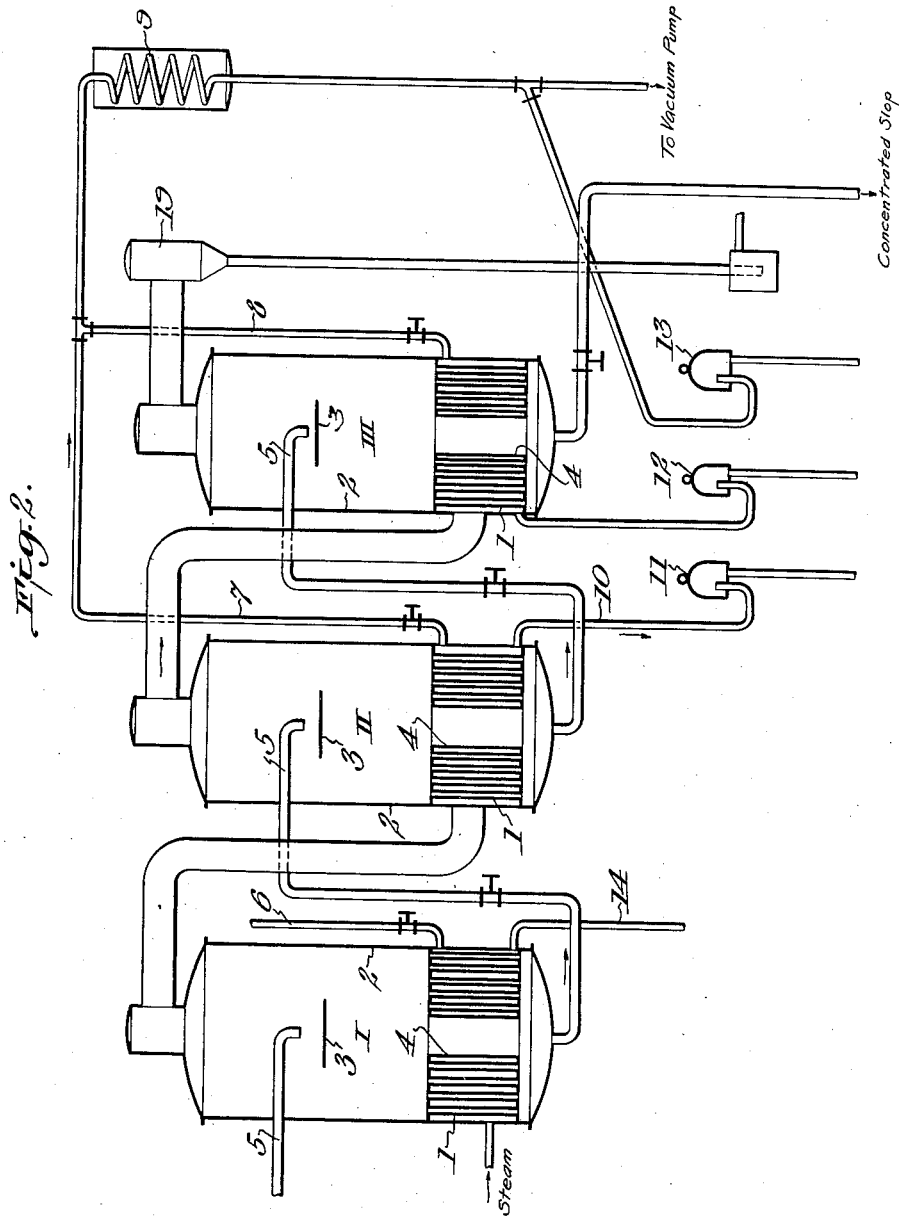

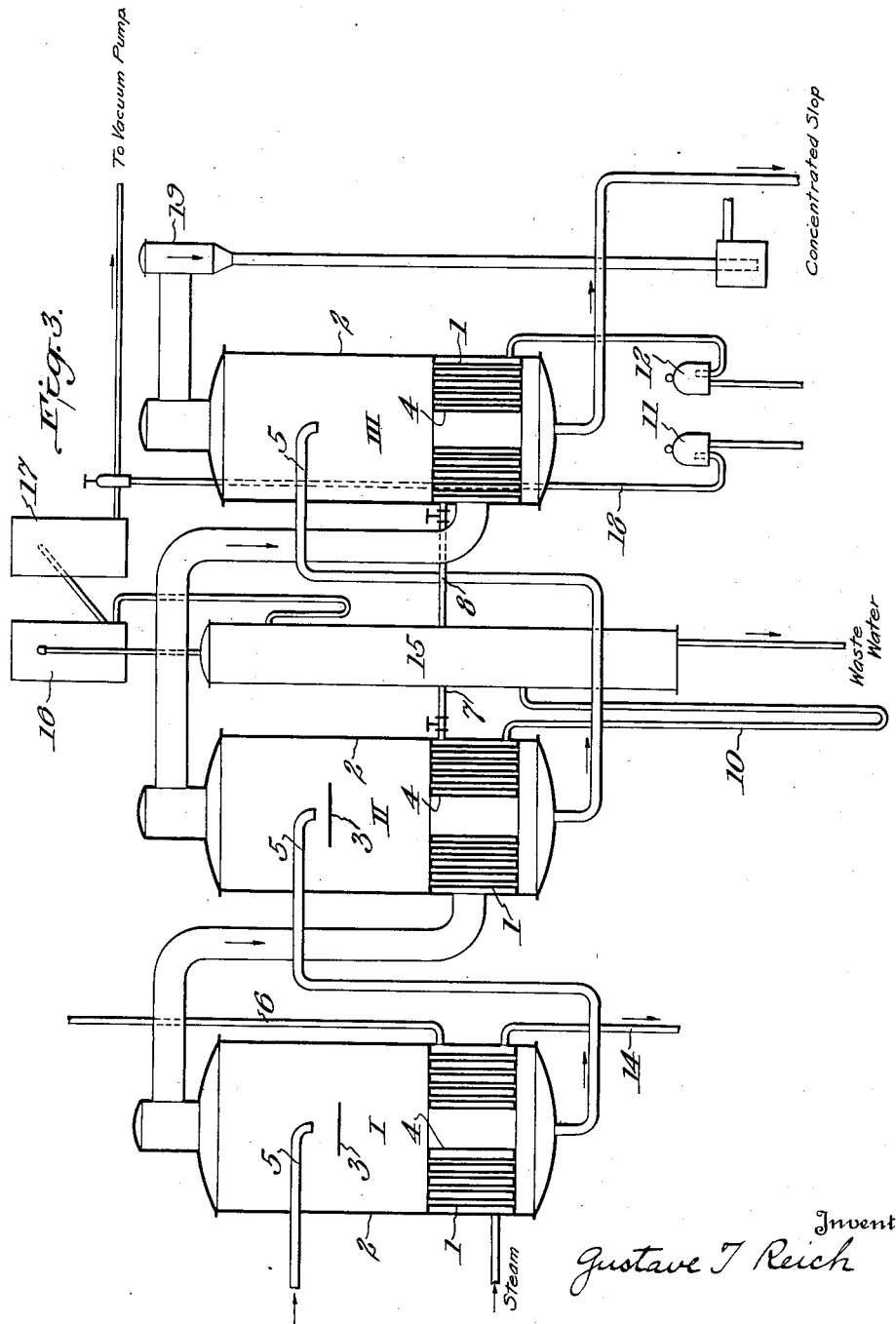

Patented Oct. 17, 1933

1,930,861

UNITED STATES PATENT OFFICE 1,930,861

CONCENTRATION EVAPORATOR

Gustave T. Reich, Anaheim, Calif.

Application November 5, 1926. Serial No. 146,516

2 Claims. (Cl. 202—174)

The concentration of trade wastes such as distillery slop, pulp millwaste and the like has in the past been the subject of a great amount of research. Owing to the tendency of such materials to foam or froth, it has heretofore been regarded as being necessary either to use very large and expensive evaporators or to accomplish the concentration by other means such as Porion furnaces or the like.

In the use of evaporators for the concentration of such materials, it has been customary to equip them with foam traps. While this expedient is very advantageous, actually the foam traps merely serve to prevent the passage of foam from one evaporator to the next succeeding evaporator in a multiple effect system, or from the evaporator to the condensing apparatus, and do not prevent the evaporators from becoming full of foam. Thus when using evaporators with foam traps the evaporators may merely serve as expansion chambers for the foam and not function effectively as evaporators.

An object of the present invention is to eliminate the objectionable foaming referred to and thereby to eliminate the large and cumbersome foam traps and increase the efficiency of the evaporators.

In my United States Letters Patent No. 1,599,185, dated September 7, 1926, I have described a process for the recovery of alcohol and other valuable materials from fermented saccharine materials by evaporation. The present invention is designed to facilitate the evaporating operation of the process disclosed in said patent and will be described in connection therewith it being understood, however, that the present invention is not limited to the recovery of alcohol from fermentation liquids but is applicable for the evaporation of other liquids having a tendency to foam.

According to the process of my Patent No. 1,599,185, referred to, a fermentation liquid known in trade as beer is concentrated to secure fractions of different alcoholic content, i. e., one fraction of high alcohol content, a second fraction containing only a few percent of alcohol and a third fraction free of alcohol. Beer always contains gases in solution which increase the tendency of the beer to foam. Moreover, when the beer is evaporated rapidly and particularly if the beer is fed into the concentrating apparatus at certain points excessive foaming occurs. The tendency of the beer to foam, of course, varies with its alcohol content.

The difficulties due to foaming are overcome in accordance with my invention by preventing the foaming, i. e., by the use of apparatus in which objectionable foaming is prevented.

The accompanying drawings illustrate apparatus embodying my invention.

On the drawings:

Fig. 1 is a diagrammatic showing of a vertical section of a triple effect evaporator system;

Fig. 2 is a diagrammatic showing of a vertical section of a triple effect system similar to that illustrated on Fig. 1, but showing adjunct apparatus, and Fig. 3 is a diagrammatic showing of a vertical section of a similar triple effect system with other adjunct apparatus.

Referring to the drawings I, II and III are the three units of the triple effect system. Each unit is of conventional construction excepting as to the following particulars. The steam chest 1 occupies about the lower one-third of the vessel 2 and a baffle plate 3 of the same shape, usually circular, as the cross-sectional shape of the down-take pipe 4 and at least as large and preferably larger, is situated directly above the down-take pipe. The feed line 5 enters the vessel 2 at a point about one-third of the height of the vessel 2 from the top thereof and delivers onto the baffle plate 3. As illustrated in Figs. 1 and 3 there is a baffle plate in only effects I and II, a baffle plate in effect III being unnecessary as will appear hereinafter, although effect III also may contain a baffle plate as illustrated in Fig. 2 without altering the operation of the apparatus.

The arrangement and size of the baffle plate with reference to the feed line and the down-take pipe is very important. The object to be attained is to prevent the feed of liquid to be evaporated from dropping directly into the down-take pipe and to spread it as evenly as possible over the upper plate or surface of the steam chest. In this way the cool feed liquid serves to chill and break any foam above the steam chest and at the same time the contact of the up-flowing hot vapors generated in the heating tubes with the finely divided feed liquid serves to heat the latter and to thereby drive off from it dissolved gases and some of its alcohol content without the production of foam, i. e., vaporization from suspended or falling drops of liquid apparently takes place at the surfaces thereof without foaming.

It is impossible to state the space relationship of the steam chest, the baffle plate and the feed pipe since this depends upon the properties of the liquid under treatment, the vacuum maintained, if any, the size of the evaporator, the relative sizes of the baffle plate and the down-take pipe and probably other conditions. It is, however, readily possible to adjust the relative positions of the baffle plate and feed pipe with reference to each other and with reference to the steam chest in any particular apparatus operating under any particular set of conditions so as to obtain the desired distribution of the incoming liquid over the upper surface of the steam chest. Ordinarily the desired adjustment may be obtained by movement of the baffle plate only. In general the higher the vacuum in the evaporator the closer is the baffle plate to the feed pipe. At atmospheric or super-atmospheric pressure the baffle plate may be about 12 inches from the feed pipe, while at pressures such as are employed in vacuum evaporators the baffle plate may be only 2 or 3 inches from the feed pipe.

As stated, the principal purpose of the baffle plate is to distribute the incoming liquid and prevent it from falling directly into the down-take pipe. It follows, of course, that the down-take pipe may be of any desired shape or that there may be a plurality of down-take pipes each protected by a baffle plate without departing from my invention. A single relatively large down-take pipe is, however, preferred.

To summarize I have found that by (1) positioning the feed pipe relatively far above the liquid level in the evaporator, (2) providing a relatively large down-take pipe, and (3) providing a baffle plate of such size and so situated as to prevent the liquid from falling directly into the down-take pipe and distribute it over the surface of the steam chest, the following results are accomplished (a) the gases dissolved in the incoming liquid are expelled from it before it mixes with the body of liquid in the evaporator, (b) the bulk of the alcohol content of the incoming liquid is vaporized therefrom without boiling the liquid and before it mixes with the body of liquid in the evaporator, and (c) foaming is largely avoided and any foam formed is broken.

Referring now to Fig. 2 of the drawings, the evaporation system illustrated comprises in addition to the apparatus illustrated in Fig. 1 my preferred arrangement of the so-called non-condensible gas lines, i. e., conduits connecting into the steam chests for the removal therefrom of air and other non-condensible gases. Usually in triple effect evaporators the non-condensible gas lines, which shall be called for convenience vent lines, are connected either to the vapor space of the same body or all the units are connected to a single manifold which in turn is connected to the condenser or to a single vacuum pump. I have found that this arrangement of the vent lines is not satisfactory in an apparatus for the evaporation of beer and similar liquids containing alcohol. My preferred arrangement is as illustrated in Fig. 2. The vent line 6 from the steam chest of effect I is simply vented to the atmosphere, preferably through a pressure valve not shown or is connected to any suitable means for removing gases from the steam chest while the vent lines 7 and 8 from the steam chests of effects II and III may be connected to a single water cooled condenser 9 and vacuum pump (not shown). Thus the removal of gases from the steam chests of effects II and III is independent of the removal of gases from the steam chest of effect I. The operation of the apparatus is determined by passing the condensates from the several units to testing apparatus and regulating the supply of live steam to the first unit and the pressures in the several units accordingly. As illustrated the condensate in the steam chest of effect II passes by way of a pipe 10 to a trap or lute 11 which, in case beer is being distilled may be provided with an alcoholometer, the condensate from effect III passes to a similar trap 12 and the condensate from the vent lines passes to a similar trap 13. The condensate from effect I is, of course, water as this effect is heated by live steam and may pass by way of the pipe 14 back to boiler. Thus the three effects of the evaporator are operated like stills, the operation being governed with reference to the strengths of distillates desired.

It will be understood that the special features of the apparatus illustrated in Fig. 2 are designed for use particularly in the evaporation of beer and similar alcoholic liquids. For evaporating other liquids the vent lines may be connected in the usual way from all three steam chests to a single condenser or evaporator body.

Fig. 3 illustrates still another arrangement of apparatus which is quite similar to the apparatus illustrated in Fig. 2, excepting that it includes a rectifying column 15 situated between effect II and effect III. The condensate from effect II may pass by way of pipe 10 to the rectifying column which has the usual dephlegmator 16 and condenser 17 which latter delivers through the pipe 18 into the trap 11. Vapor lines 7 and 8 may connect into the column and through it to the vacuum pump (not shown). By this arrangement it is possible to evaporate and rectify simultaneously and thereby to directly produce a distillate of high concentration. Whereas, in the apparatus illustrated in Fig. 2 operating upon beer there is produced in effect II an alcohol distillate of about 60° and in effect III an alcohol distillate of about 4° the apparatus of Fig. 3 produces an alcohol distillate from the column of about 190° and a distillate in effect III of about 4°. The column might be placed between effects I and II instead of between effects II and III and the apparatus can be operated on the counter-current principle also.

Each of the three plants illustrated includes the usual barometric condenser 19 receiving the vapors from effect III.

While I have described my invention above in detail it is to be understood that various changes are possible therein without departing from the spirit of the invention.

I claim:

1. An evaporator comprising a vertical substantially cylindrical closed chamber, a steam chest occupying about the lower one-third of said closed chamber having at least one down-take pipe, a feed pipe having its discharge end within and positioned about one-third of the height of said chamber from the upper end thereof, and a baffle plate positioned between the discharge end of said feed pipe and said down-take pipe.

2. A multiple effect evaporator comprising several evaporators of the type defined in claim 1 wherein the baffle plates of the effects operated under a higher vacuum are placed closer to the feed pipe than in the effects operated under a lower vacuum.

GUSTAVE T. REICH.